Aug. 19, 1952     H. F. HEIDEGGER     2,607,236
GENEVA GEARING

Filed July 8, 1948     4 Sheets-Sheet 1

INVENTOR
HENRY F. HEIDEGGER
BY
James B. Boyer
ATTORNEY

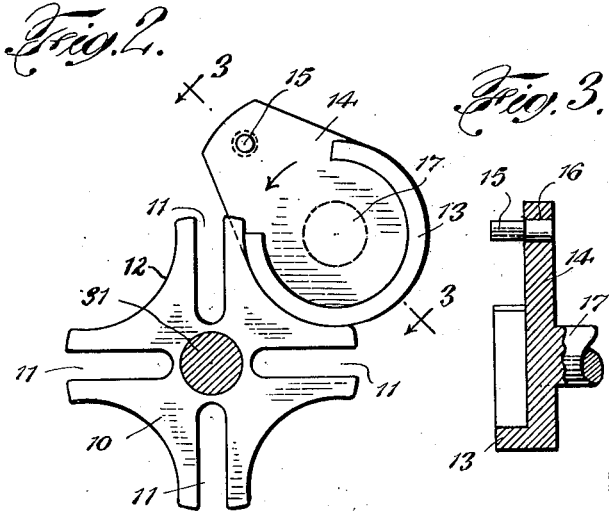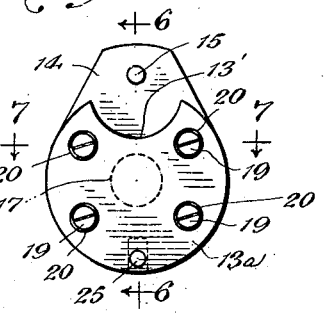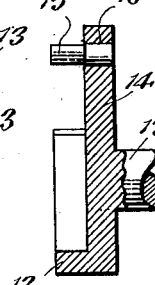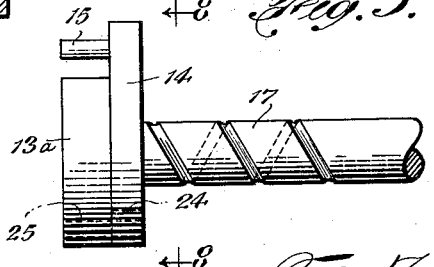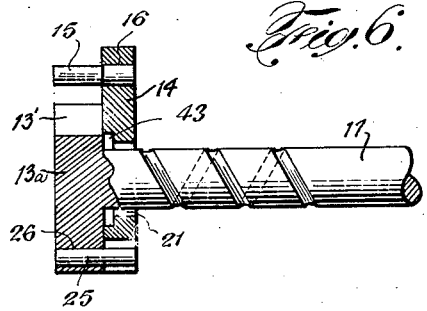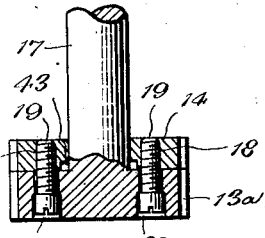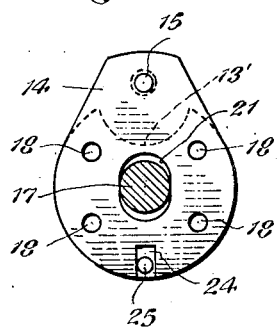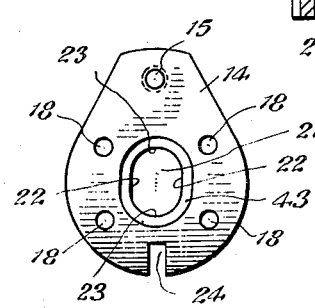

Aug. 19, 1952  H. F. HEIDEGGER  2,607,236
GENEVA GEARING

Filed July 8, 1948  4 Sheets-Sheet 3

INVENTOR
HENRY F. HEIDEGGER
BY
James B. Boyer
ATTORNEY

Aug. 19, 1952    H. F. HEIDEGGER    2,607,236
GENEVA GEARING
Filed July 8, 1948    4 Sheets-Sheet 4
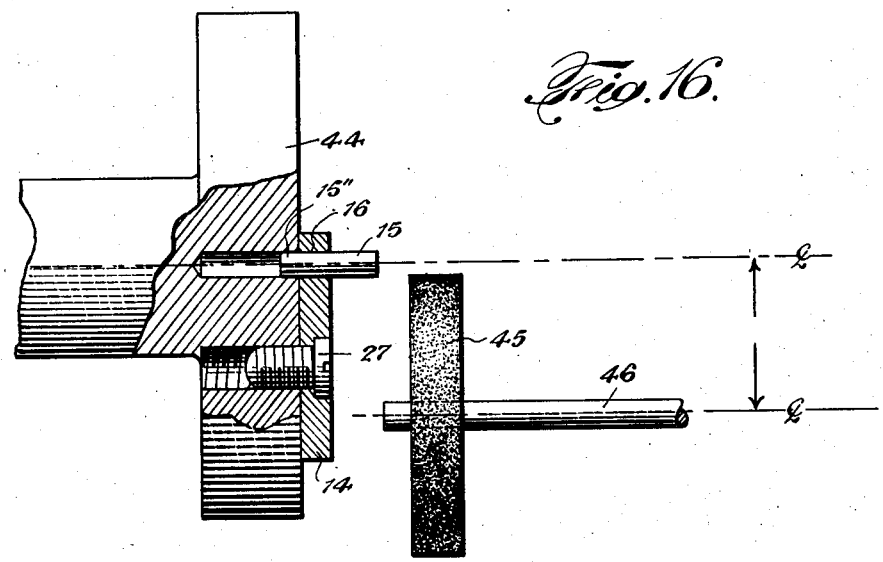
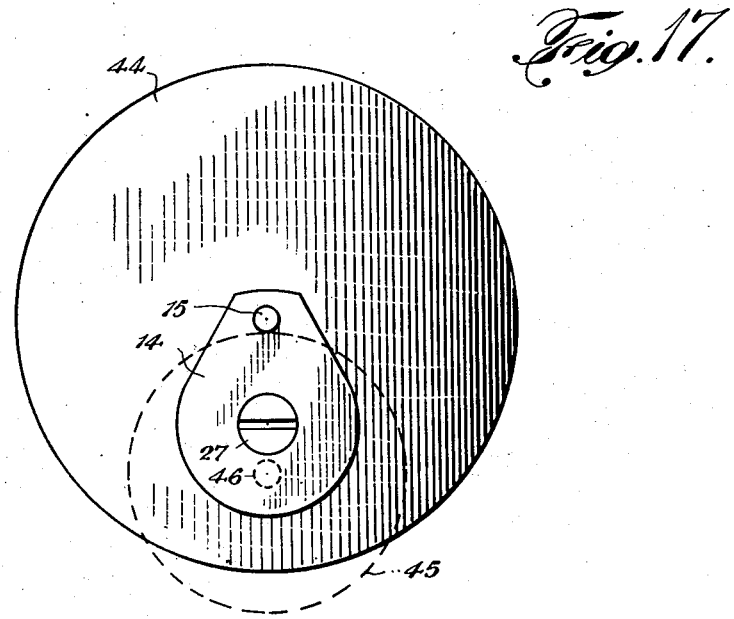
INVENTOR
HENRY F. HEIDEGGER
BY
James B. Boyer
ATTORNEY Patented Aug. 19, 1952

2,607,236

UNITED STATES PATENT OFFICE 2,607,236

GENEVA GEARING

Henry F. Heidegger, Glen Ridge, N. J., assignor to International Projector Corporation, Bloomfield, N. J., a corporation of Delaware Application July 8, 1948, Serial No. 37,701

14 Claims. (Cl. 74—436)

The present invention relates to motion picture projectors, and more especially to an intermittent movement of the Geneva or Maltese cross type, which forms part of the intermittent film feed mechanism in a motion picture projector.

The invention particularly pertains to a novel and improved crank arm and pin unit which drives the star wheel of a Geneva movement, and to the method of constructing and assembling the same.

Divisional application Serial Number 259,974, filed December 5, 1951, relates to the disclosed means and method of manufacturing the drive units for intermittent movements.

Heretofore, the cam or locking element which intermittently holds the star wheel and connected parts against rotation, has been formed integral with the crank arm and the crank shaft. As thus manufactured, a bar of solid stock of a diameter slightly larger in diameter and longer than the over-all length of the crank arm is placed in a lathe, and turned down to form a crank shaft of the required diameter at one end of which is a thick circular disc.

The part is then placed in a punch press and the disc sheared to approximately the size and shape of the crank arm. Thereafter, the outer face of the crank arm is milled out to form a cylindrical collar or locking cam cut away or mutilated at a point exactly in the same radius with the outer end of the crank arm and the axial center of the crank shaft, which arm likewise is milled down to the desired thickness. This collar is of substantially the same cylindricity as the inner end of the crank arm, and is co-axial with, and partially encircles, the inner end of the crank shaft, which inner end, because of the milling of the collar, or locking element, may project centrally of the collar and be of the same height. It is wholly optional whether or not the end of the shaft projects centrally of the collar or locking cam. The entire area enclosed within the mutilated collar may be milled out if desired.

Milling out the excess material to form the collar or locking element reduces the weight of the part, but it is obvious that this milling operation may be confined merely to forming an arcuate recess in the disc in line with and adjacent the outer end of the crank arm, and reducing the thickness of the material forming the outer end of the crank arm sufficiently to afford room for its engagement and co-action with the radial slots of the star wheel constituting the driven member of the intermittent movement.

The part is now hardened, after which, the outer end of the crank arm is annealed and a seat or opening drilled therethrough into which one end of a hardened and finished pin is press-fitted or driven.

The opening must be very accurately located with relation to its radial distance from the center of the crank shaft, and also with relation to the opposing cusps or ends of the mutilated collar or locking element, it being necessary to maintain a substantially equilateral triangular relation between the cusps and pin.

Also, it is imperative in an intermittent movement of this type, that the pin be of even diameter throughout its length, and that it lie parallel with the shaft in both directions.

Yet notwithstanding the use of accurate jigs and fixtures, and the exercise of the greatest care in machining, the majority of the pins were out of parallelism with the crank shaft, there being insufficient room between the cusps of the mutilated collar and the pin to enable the pin to be ground evenly and to true it relatively to the crank shaft.

Because of the lack of room to use tools, it was customary to peen the pin from various angles to straighten it to its proper position, which operation was only partially effective and often resulted in loosening the pin in its seat, requiring the substitution of a new pin, all of which consumed time and labor, which increased the cost of manufacture.

One object of the present invention is to materially improve the crank arm and pin mounting of an intermittent movement.

Another object is to facilitate the method of manufacture of such units, with a consequent reduction in time and labor cost, and to insure more accurate machining of the parts.

My improved method wholly eliminates any necessity for peening the wrist pin after it is seated in the crank arm and after the parts are assembled.

To this and other ends, the crank arm may be blanked out of a metal sheet separately from the drive shaft and locking disc, which permits the finishing of the crank arm before it is assembled with the drive shaft and locking disc. An opening is formed through the crank arm near its inner end and after the wrist or drive pin has been machined or ground while firmly fixed in its seat in the outer end of the crank arm, the parts may be assembled by inserting the unobstructed end of the drive shaft through the opening in the crank arm, and the arm slid along the shaft until arrested by contact with the locking disc or cam on the shaft, to which disc the crank arm is suitably secured, as by threaded fastenings.

Or, as shown in the modified form, the drive shaft, locking cam and crank arm are all formed separately, which facilitates grinding the inner and outer faces of the locking cam and of the crank arm, to exact parallelism, and effects an economy in labor and metal, since a rod of approximately the desired diameter of the drive shaft can be turned down to size.

Thereafter, a reduced end of the shaft is press-fitted into a hole formed centrally of the locking cam until the shoulder at the juncture of the reduced end with the body of the drive shaft seats squarely against the inner face of the locking cam, and the wrist pin having been press-fitted into the aperture near the outer end of the crank arm and ground, the finished crank arm is slid onto the shaft, and rotated thereon until the mutually co-acting guide and locating means on the inner abutting faces of the locking cam and crank arm engage, after which the radial or longitudinal adjustment is made between the wrist pin and the clearance recess, and the crank arm and locking cam fastened together.

In either structure, the method of forming the crank arm is the same. The crank arm blank may be formed in a punch press from a plate of the required gauge or thickness, both side faces of the crank arm blank being ground parallel with each other and perpendicular to an opening formed through the blank as more fully explained hereinafter.

An oversized driving pin is set in an opening drilled at a predetermined point in the outer annealed end of the crank arm blank, but the exact determination of this opening is not now as critical as heretofore, because of the provision for adjustability of the crank arm transversely of the shaft, which improvement constitutes a part of this invention.

While the crank arm and pin are yet disconnected from the shaft and locking disc, and hence, easily machined, the crank arm is placed in a surface grinder to finish the crank arm, and after the crank pin is seated in the arm, the crank arm and pin are mounted on a face plate or chuck in a special manner to enable the pin to be ground until it is exactly perpendicular with the parallel side faces of the crank arm, and of even cylindricality.

An arcuate recess is milled in the periphery of the locking disc to form a clearance, enabling the teeth of the star wheel to clear the locking disc as the star wheel is intermittently rotated by the crank arm and pin.

A further object of the invention is to provide means to hold the crank arm in exact angular relation to the crank shaft and yet permit adjustment of the crank arm radially of the shaft to properly locate the crank pin in accurate relation to the cusps of the arcuate recess in the cam or locking disc.

Other novel objects and advantages of this invention will be referred to in the following description and particularly pointed out in the claims.

In the accompanying drawings:

Fig. 1 is a fragmentary perspective view of a motion picture projector, taken from the operator's side, showing the location of the present invention in relation to other operating parts of the machine, Fig. 2 is an end view of an old form of star wheel and crank arm, Fig. 3 is a sectional view taken through the major axis of the old form of crank arm on line 3—3 of Fig. 2, Fig. 4 is an end view of a preferred embodiment of the present invention, showing the two units of the crank arm assembled.

Fig. 5 is a side view of Fig. 4,

Fig. 6 is a sectional view taken on line 6—6 of Fig. 4,

Fig. 7 is a sectional view taken on the line 7—7 of Fig. 4,

Fig. 8 is a sectional view taken on the line 8—8 of Fig. 5,

Figure 10:
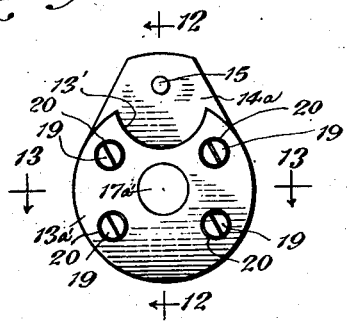
Figure 11:
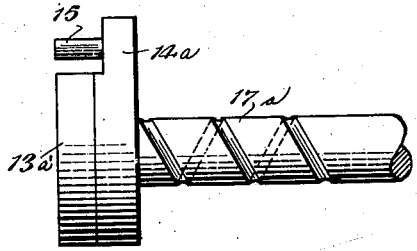
Figure 12:
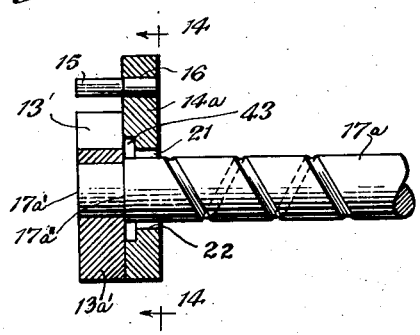
Figure 13:
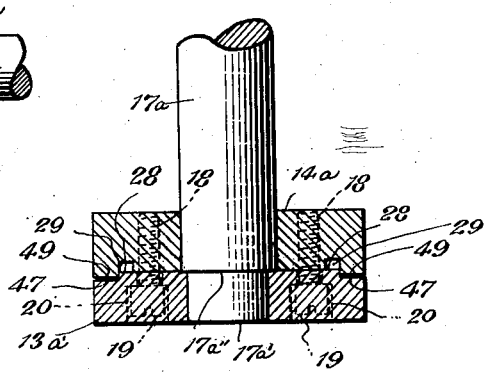
Figure 14:
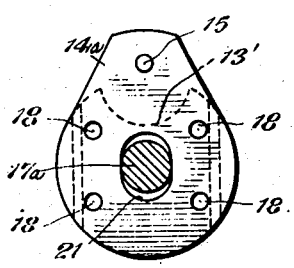
Figure 15:
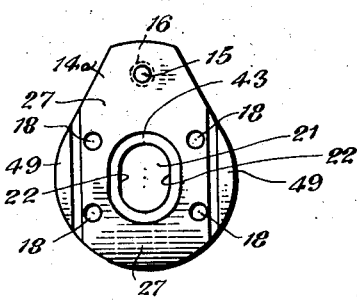

Fig. 9 is a detail view of the inner face of the crank arm, showing the driving pin and crank arm removed from the crank shaft and locking disc, Fig. 10 is an end view of a slightly modified form of crank arm, Fig. 11 is a side view of the modification shown in Fig. 10, Fig. 12 is a sectional view taken on the line 12—12 of Fig. 10, Fig. 13 is a sectional view taken on the line 13—13 of Fig. 10, Fig. 14 is a sectional view taken on the line 14—14 of Fig. 12, Fig. 15 is a detail front view of the inner face of the modified form of crank arm shown in Fig. 13, Fig. 16 is a diagrammatic view in side elevation of the novel method of grinding the wrist or crank pin, and Fig. 17 is a detail face view of the crank arm attached to the face plate of a grinding lathe.

Figure 1:
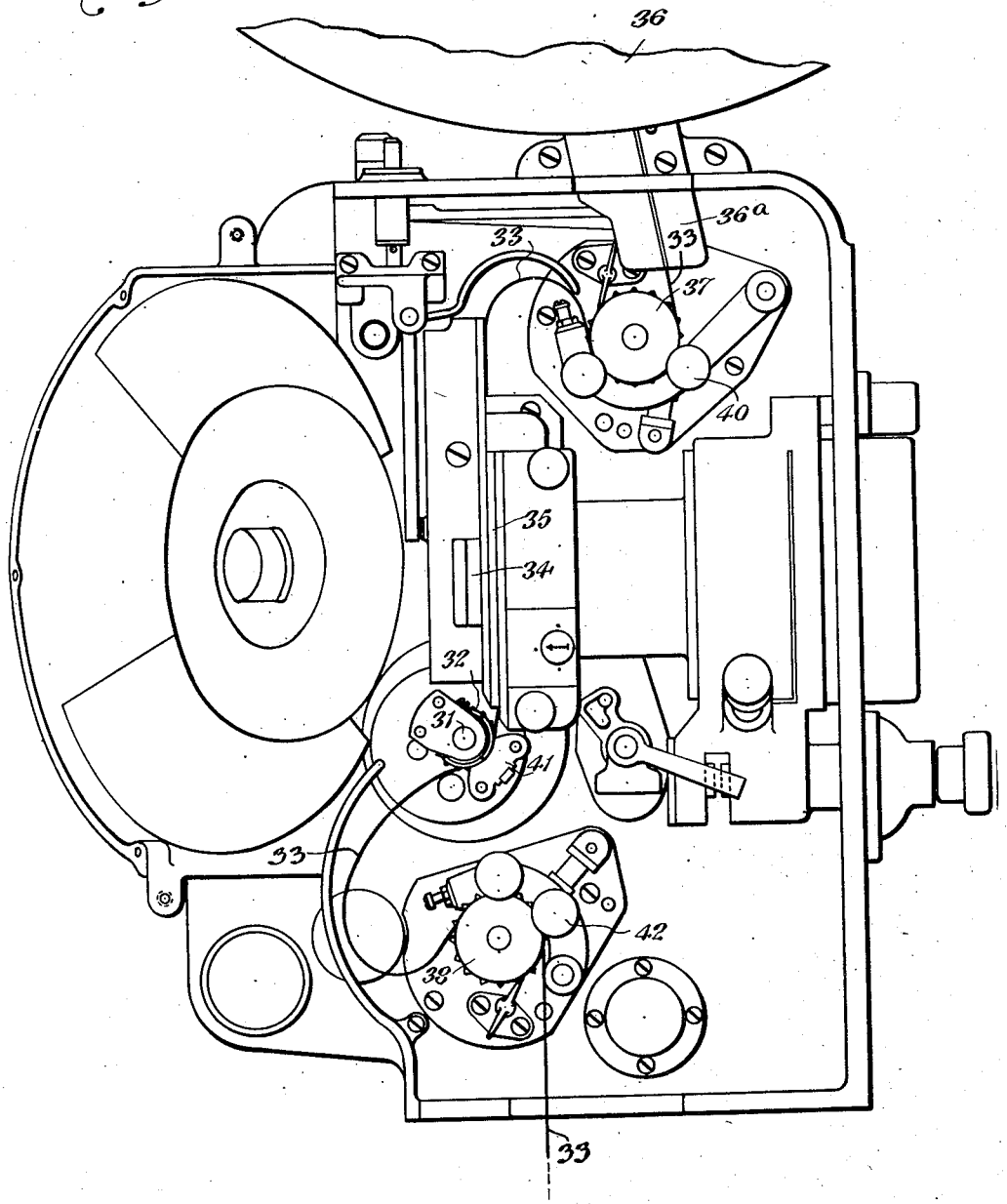

In motion picture projecting machines, it is customary to place a reel of film on a spindle (not shown) in the upper magazine indicated at 36, Fig. 1. The leading end of the film 33 is then threaded down through a throat or roller holder 36a, thence beneath and part-way around the upper continuously rotating sprocket 37, the teeth of which enter holes formed near the side edges of the film in the usual manner. The film is held engaged with the sprocket teeth by pad rollers or shoes 40. After leaving the upper sprocket 37, the film strip is formed into a loop or bight to provide slack, and is then led downwardly between a film trap and gate 35 through which is formed a transverse passage for a light beam from a suitable source. An aperture plate 34 slidably mounted in the film trap intersects this light passage, the plate having the usual projection aperture formed therein to register with the light passage. The film passes in front of and closely adjacent to the projection aperture. Emerging from the bottom of the film trap and gate, the film passes beneath and partly around an intermittent or pull down sprocket 32 fast on a driven shaft 31, suitably journaled in any convenient manner (not shown). The driven shaft 31 and the pull down sprocket 32 are intermittently turned step by step through arcs of equal angularity alternating with dwell periods, during which dwell periods, the picture images are projected onto the screen, in well known manner.

Suitable means 41 holds the film engaged with the teeth of the intermittent sprocket 32 which functions to pull down the film by equal increments of movement to position the successive picture images or frames, separated by frame lines, in register with the projection aperture of the aperture plate 34.

The action of this pull down sprocket is, perhaps, one of the most critical features of the machine, since the picture images must be pulled down into exact register with the projection aperture so that images only, without frame lines, shall be projected on the screen.

One well known method of imparting the necessarily accurate intermittent pull down movements to the intermittent sprocket is by a Geneva movement, which must operate smoothly, evenly and quietly, and the present invention is directed to the improvement of such an intermittent movement and to the method by which it is manufactured.

After leaving the intermittent or pull down sprocket 32, addtional slack is provided by forming a bight in the film strip 33 which strip is then, led over a second or lower continuously rotating sprocket 38 with the teeth of which the film is held engaged by the associated pad rollers or shoe 42. From this lower continuously rotating sprocket the film is led down into a sound head (not shown).

With reference to Figs. 2 and 3 of the drawings, showing a previous form of Geneva or intermittent movement on which my invention is an improvement, a star wheel 10 fast on the driven shaft 31, is provided with the usual radial slots 11 engageable by a wrist or drive pin 15 mounted near the free end of a crank arm 14 fast on a driving crank shaft 17.

In such previous form mutilated locking cam 13 resembling an open cylindrical collar is formed on the outer side face of, and integral and coaxial with, the crank arm 14, to co-act with the equidistantly spaced concave recesses or dwells 12 alternating with the radial slots 11 of the star wheel, to lock the star wheel against rotation during its dwell or rest periods.

The wrist or drive pin 15 is press-fitted into an opening 16 (Fig. 3) drilled near the free end of the crank arm 14, and in this old form the distance between the axial centers of the pin 15 and the crank shaft 17 should be held to a tolerance of one ten-thousandth of an inch to insure that, as the crank arm rotates in the direction of the arrow, Fig. 2, the wrist pin 15 shall exactly register with the open ends of the radial slots 11 in the star wheel 10 and easily slide therein without binding as it turns the star wheel to impart a full 90 degree arc of rotation to the star wheel during a complete rotation of the crank arm.

Likewise, it is essential that the wrist pin 15 be in exact parallelism with the crank shaft 17 which is very difficult to attain, in commercial practice, when the crank arm and locking collar are integral, since there is no room to use the proper grinding means to true the wrist pin. For instance, a grinding stone rotates at high speed, and a stone small enough to grind the pin in such constricted space would wear away or erode so rapidly that the pin would not be ground perfectly cylindrical, nor would it be parallel with the crank shaft in both directions. As a result, much hand work and extreme care were required to straighten the pin to the proper position.

Furthermore, the work of turning down a solid piece of bar stock to form a crank shaft with a thickened circular disc on one end, shearing the disc in a punch press to form a crank arm, milling out the disc to form a cylindrical, open, locking cam, as well as reducing the thickness of the crank arm, and then grindng the part to scale, involved considerable time and labor and was wasteful of material.

The present invention avoids the foregoing objections by forming the crank arm 14 separately from the crank shaft 17 and locking disc 13, as shown in Figs. 6 and 7.

This apparently simple change leads to the elimination of the disadvantages inherent in the former structure, and provides advantages not present in former structures.

The crank shaft 17 and locking disc 13a may be formed integrally of one piece of stock, or separately, as desired. If made separately, the locking disc 13' (Figs. 11–13) is securely fastened to the outer end of the crank shaft 17a by pressfitting one end 17a' of the crank shaft into a slightly smaller hole formed in the exact center of the locking disc, as shown in Figs. 12 and 13.

However, in the form shown in Figs. 5 to 7, the crank shaft and locking disc are formed of a single piece of bar stock which is placed in a lathe and turned to the proper dimensions, a slight countersink being formed, if necessary, at the juncture of the shaft 17 and disc 13a to remove the fillet. The shaft and disc are hardened and then ground to the exact size required.

During the grinding operation, both the inner and outer faces of the locking disc 13a are ground absolutely parallel with each other and with the diameter of the disc so as to be perpendicular to the longitudinal axis of the crank shaft.

Prior to the grinding operaton, an arcuate clearance recess 13' of proper size is milled in the periphery of the locking disc 13a and a plurality of relatively spaced, unthreaded holes 20, Figs. 4 and 7, counterbored on the outer face of the locking disc, are drilled transversely through the locking disc to accommodate the means for fastening the crank arm 14 (now formed separately) to the locking disc, as will be more fully explained hereinafter.

Subsequently to the grinding operation, a locating and guide stud 25 is press-fitted into a hole 26, Fig. 6, previously drilled through the locking disc 13a, at a point diametrically in line with the axial center of the crank shaft and the deepest point of the arcuate clearance recess 13' in the periphery of the locking disc, as seen in Fig. 4. The locating stud 25 projects some distance beyond the inner face of the locking disc 13a, for co-action with the crank arm 14 in a manner and for a purpose hereinafter explained.

Forming the crank arm 14 separately from the locking disc 13a enables the production of a much more accurately dimensioned and readily machined locking disc with a material saving in time and labor.

And fully as much improvement is effected in the ease and accuracy with which the separate crank arm may now be manufactured. Thus, the crank arm blank (Figs. 4 and 9) is now perfectly flat unencumbered by the locking cam or disc, the blank being punched from a plate, in a die press, to approximate dimensions, after which a slotted opening 21, Figs. 6, 8 and 9 is formed centrally through the blank, said opening being slightly elongated in the direction of the long diameter of the blank which constitutes the major axis of the slot, said slot 21 having parallel sides, as at 22, Fig. 9, the ends 23 of the elongated slot or opening being rounded to conform to the periphery of the crank shaft 17 on which the crank arm 14 is to be mounted.

Being perfectly flat on both sides, the crank arm is now held in the magnetic chuck of a surface grinder to enable both sides of the crank arm to be easily and quickly ground parallel with each other and perpendicular to the longitudinal axis of the crank shaft to cause the inner ground faces of the locking disc 13a and crank arm 14, when assembled, to maintain a close fitting contact.

A small opening 16 (Fig. 6) corresponding with the opening 16 in the old form of intermittent movement shown in Figs. 2 and 3, is formed near the free end of the crank arm 14 into which opening is press-fitted a wrist pin 15 of slightly larger diameter.

The location of the opening 16 is important and the parallelism of the wrist pin and crank shaft when the parts are assembled, is very important to enable the smooth steady engagement and disengagement of the wrist pin 15 relatively to the slots 11 in the star wheel.

To obtain this parallel relation of the wrist pin and crank shaft, the inner face of the crank arm 14 has been counterbored, as at 43, Fig. 9, around the elongated slot or opening 21, to a depth slightly greater than the thickness of the thin head of a screw 27 (see Figs. 16 and 17). Thus equipped, the crank arm is secured by the screw to the face plate 44 of a grinding lathe or machine, the head of the screw 27 lying in the counterbore below the outer face of the crank arm 14, out of the way of the grinding wheel or tool 45. The crank arm is so located on the face plate 44 that the unfinished wrist pin 15 press-fitted into the hole 16 (Figs. 6 and 16), lies exactly in line with the axis of rotation of the face plate of the grinding lathe. The rear end of the wrist pin may extend slightly beyond the rear face of the crank arm, as a teat 15'', to enter the usual hollow center of the face plate and thus afford a centering gage for the wrist pin.

By thus fastening the crank arm to the face plate, the wrist pin will be rotated on its own axis as the face plate rotates.

The grinding wheel or tool 45, Fig. 16, mounted on a rotating shaft 46 arranged parallel with the axis of rotation of the face plate 44, is caused to traverse the wrist pin from its outer end to the face of the crank arm during the rotation of the face plate and crank arm which results in forming a perfectly cylindrical wrist pin as the latter turns on its own longitudinal axis, so that the pin is absolutely parallel with the crank shaft 17 when the crank arm is assembled therewith. This result is assured since the faces of the face plate 44 and the crank arm are perpendicular to the grinding wheel shaft 46, and the screw 27 is parallel with the grinding wheel shaft.

Incidentally, the teat 15'' is ground off after the wrist pin has been ground to scale.

The wrist pin 15 near the outer end of the crank arm must be so located as to be equidistant from the cusps or edges of the arcuate clearance recess 13' and in triangular relation with said edges. Also the wrist pin seat 16 must lie in line with the major diameter of the elongated slot 21 and of the crank arm, but the location of these critical points is much more readily determined by my improvement than in the prior structure on which my invention is an improvement.

Returning now to the embodiment of Figs. 4 to 9, it will be recalled that a locating and guide stud 25 projects from the inner face of the locking cam or disc 13a at a point near the periphery of the disc.

To effect the proper adjustment or location of the wrist pin 15 relatively to the edges of the clearance recess 13', a slit 24, Figs. 4, 8 and 9, is cut in the rounded periphery or heel at the inner end of the crank arm 14, the slit lying in line with the longer diameter of the centrally located elongated opening 21 in the crank arm 14 so as to register with the locating stud 25.

This slit 24 is just wide enough to accommodate the locating stud 25 projecting from the inner face of the locking disc 13a, with sufficient clearance only to enable the crank arm 14 to slide relatively to the stud. The crank arm, due to the engagement of the guide slit and pin, is adjustable in a straight line only, transversely of the crank shaft a slight distance permitted by the length of the elongated opening or slot 21, the crank arm being rotatable on the crank shaft to bring the slit 24 into registry with the locating stud 25, after which the crank is slid axially against the inner face of the locking disc 13a so that the walls of the slit embrace the locating pin to prevent rotation of the crank arm on its shaft.

In assembling the parts, the unobstructed end of the crank shaft 17 is inserted through the centrally located slot 21 of the crank arm 14 from the inner face of the crank arm, which arm is then slid along the shaft and, if necessary, turned thereon, to align the locating slit 24 with the locating pin 25 projecting from the inner face of the locking disc 13a. When the locating slit and its pin are aligned, the crank arm is slid axially against the locking disc to bring the parallel inner faces of the crank arm and locking disc into close contact or abutment, during which operation the locating stud 25 is embraced by the walls of the locating slit 24. Fastening means, as fillister-headed screws 19 are then inserted as seen in Fig. 7 through the unthreaded counterbored holes 20 of the locking disc, the threaded ends of the fastening means being screwed into threaded or tapped holes 18 formed through the inner end of the crank arm 14 to register with the counterbored holes 20 of the locking disc. The counterbored holes 20 are slightly larger in diameter than the tapped holes 18 in the crank arm to enable such slight relative adjustment of the crank arm and locking disc as may be required. The screws 19 are not turned down tightly at this time, their present purpose being merely to hold the crank arm in close relation to the locking disc during the process of adjusting the crank arm relatively to the locking disc.

This adjustment is readily effected by gently tapping the crank arm 14 at its inner or outer ends along its major axis until the wrist pin 15 lies in proper relation with the edges of the arcuate clearance recess 13', the locating pin 25 and slit 24 preventing any turning movement of the crank arm on the crank shaft during such adjustment. The locating slit 24 is of sufficient length to permit the required adjustment of the crank arm 14 relatively to the locking disc 13a, and still prevent rotation of the crank arm.

After the crank arm and locking disc are in proper adjustment, the headed screws 19 are turned down tightly to preserve the adjustment, the square shoulders of the heads of the screws bearing against the square shoulders formed by counterboring the holes 20, to squeeze the parallel inner faces of the crank arm and locking disc tightly together which occasions a frictional adherence of the inner faces.

This arrangement provides a still further advantage not present in the former structure on which my invention is an improvement, in that, in case of the breakage of the wrist pin 15, for instance, the crank arm 14 can be removed and a new one substituted, already equipped with a properly ground wrist pin which will be parallel with the crank shaft when the new crank arm is assembled therewith. Thus, there is provided an interchangeability of parts.

Also, it will be apparent that the provision of a crank arm and pin bodily adjustable relatively to the crank or drive shaft affords a means for insuring that the wrist or drive pin shall impart a substantially exact 90 degree movement to the star wheel, not only for the purpose of accurately feeding or "pulling down" the film a distance which shall displace one picture image from register with the projection aperture and bring the succeeding picture image or frame into exact register with the projection aperture, but also to simultaneously advance the slotted projections of the star wheel then engaged by the pin a sufficient distance beyond the trailing edge or cusp of the clearance recess 13' to prevent collision therewith.

Of course, the seating of the cam disc 13a in the dwell of the star wheel may be relied upon to rectify any minor inequality in the pull down feed, but adjustment of the crank arm and pin, by lengthening or shortening the duration of engagement of the pin and star wheel, permits some slight variation of the throw imparted by the pin to the star wheel.

The modification illustrated in Figs. 10 to 15 differs from the form shown in Figs. 4 to 9 in details of construction only.

Thus, referring to Figs. 10 to 13 particularly, it will be seen that the locking disc 13a' and crank shaft 17a are formed separately to illustrate the alternative method of construction hereinbefore mentioned. A reduced end 17a' of the crank shaft 17a is press-fitted into a hole of slightly smaller diameter drilled exactly centrally of the locking disc 13a', the juncture of the reduced end 17a' and the crank shaft 17a forming a square shoulder 17a'' abutting the flat inner face of the locking disc around the hole to fit squarely against the inner face of the locking disc, so that the shaft and locking disc will be perpendicular to each other.

The circular locking disc 13a' is peripherally recessed at 13', as in the form shown in Figs. 4 to 8, to provide clearance for the teeth of the star wheel 10, as it is advanced step by step, but unlike the form shown in Figs. 4 to 8, the locking disc of the alternative form is not equipped with a locating stud. Instead, two diametrically opposite sides or segments of the inner face of the locking disc are milled off or reduced in height, as at 47 (Fig. 13), to leave between them a centrally disposed table or raised portion 28 having two sides which are in exact parallelism with each other and also parallel with a line diametrically intersecting the deepest point in the clearance recess 13' and the axial center of the crank shaft 17. This raised table 28 formed on the inner face of the locking disc serves as a guide for the crank arm 14a, and its wrist pin 15 in their adjustment transversely of the crank shaft.

The crank arm 14a of the modification, like the crank arm of the form of my invention first described, is provided with a centrally disposed slot or elongated opening 21 having straight parallel sides, and rounded ends, the longitudinal diameter of the slot being in line with a crank pin seat 16 formed near the outer free end of the crank arm. However, the inner face (Figs. 13 and 15) of the crank arm 14a is milled out from end to end to form a shallow centrally and longitudinally extending trough 27 flanked on opposite sides by clearance grooves 29 slightly deeper than the longitudinally extending trough 27, leaving unreduced diametrically opposed segmental areas or ways 49 complementary and of similar shape, to the segmental, reduced areas 47 of the locking disc 13a'. The width of the trough or channel 27 formed in the inner face of the crank arm added to the widths of the respective grooves 29 on opposite sides of the trough is just sufficient to enable the ways 49 to embrace the guide table or rail 28 formed on and extending diametrically of the inner face of the locking disc 13a'.

The wrist pin 15 is press-fitted into the seat 16 near the outer end of the crank arm 14a, the inner and outer faces of the crank arm being ground as heretofore explained in reference to the form of my invention shown in Figs. 4 to 9. The provision of the clearance grooves 29, in the inner face of the crank arm enables the bottom of the trough 27 on the inner face of the crank arm to be ground parallel with the outer face of the crank arm without leaving fillets along the side edges of the trough, the grooves also enabling the side walls of the trough to be ground parallel with each other to a point below the bottom of the trough. The faces of the segmental ways 49 are also ground to a horizontal plane, and the crank or wrist pin 15 is ground to a true cylinder and to parallelism with the crank shaft 17 in the same manner as heretofore explained; a counterbore 43 being formed around the edge of the slot 21 in the inner face of the crank arm to accommodate a screw, as heretofore explained.

In assembling the parts, the reduced end 17a' of the crank shaft 17a is first press-fitted into the hole centrally located in the locking disc 13a'; the opposite end of the shaft is then inserted through the slot 21 from the inner face of the crank arm, which arm is slid along the shaft toward the locking disc, the arm being turned on the shaft, if necessary, to register the trough or reduced portion 27 on the inner face of the crank arm with the raised table or guide 28 on the inner face of the locking disc, whereupon the arm is fitted to the locking disc with the bottom of the trough 27 in contact with the raised table or guide, and the segmental ways 49 of the crank arm embracing the straight parallel sides of the raised table or guide, the horizontal faces of the segmental ways 49 bearing against the complementary horizontal reduced faces 47 on opposite sides of the raised table or guide 28.

The co-action of the guide table 28 with the ways 49 prevents rotary movement of the crank arm, but permits a sliding adjustment of the crank arm transversely of the shaft to enable the wrist pin 15 to be properly located relatively to the edges of the clearance recess 13', as in the form of invention shown in Figs. 4 to 9.

Upon obtaining the proper adjustment, the crank arm 14a is secured to the locking disc 13a', preferably by the fastening means 19 accommodated in counterbored oversized holes 20 extending through the locking disc, and threading into holes tapped in the inner face of the crank arm, as explained in connection with the first form of invention.

Changes and alterations may be made in the form and arrangement of the several parts described without departing from the spirit and scope of the invention as set forth in the following claims.

What I claim as new is:

1. In an intermittent movement for motion picture projecting machines, the combination with a star wheel, of a drive unit therefor, including a drive shaft; a crank arm adjustable radially of the shaft; a wrist pin carried by the arm to cooperate with the star wheel; means fast on the drive shaft to lock the star wheel when the star wheel is idle; and means to adjustably secure the crank arm directly to said locking means.

2. In an intermittent movement for motion picture projecting machines, the combination with a star wheel; of a drive unit therefor, including a drive shaft; a crank arm formed separately from the drive shaft, and mounted for radial adjustment on the shaft; a wrist pin carried by the arm to impart intermittent movement to the star wheel; means fast on the drive shaft to which means the crank arm may be secured when in adjusted position; mutually co-acting elements on the crank arm and the last-named means to restrict the radial adjustment of the crank arm to a predetermined radius and means to secure the crank arm directly to said last-named means against relative movement after the crank arm has been adjusted.

3. In an intermittent movement for motion picture projecting machines, the combination with a star wheel; of an assembled drive unit therefor, including a drive shaft; a crank arm formed separately therefrom and being slotted along its major axis to accommodate the drive shaft and enable adjustment of the crank arm radially of the shaft; a wrist pin projecting laterally from a point in the major axis of the arm near the outer end of the arm; and means fast with the shaft, to which means the crank arm is secured against movement relative thereto when adjusted to the desired position.

4. In an intermittent movement for motion picture projecting machines, the combination with a star wheel; of an assembled drive unit therefor, including a drive shaft; a crank arm adjustable radially of the shaft; a wrist pin carried by the arm to impart a step by step rotation to the star wheel; means fast on the drive shaft to which means the crank arm is secured when in adjusted position; and a pin and slot connection between the last-named means and the crank arm to confine the radial adjustment of the crank arm to a predetermined straight line.

5. In a motion picture projection machine, the combination of a star wheel; means to impart an intermittent movement to the star wheel, alternating with dwell periods, including a drive shaft; a locking disc secured to the shaft to co-act with the star wheel, to lock the star wheel against rotation during the dwell periods, the periphery of the locking disc being recessed; a crank arm formed separately from the locking arm; a crank pin projecting laterally from a point near the free end of the crank to impart intermittent movement to the star wheel, the crank arm having an elongated aperture located centrally of the hub of the crank arm and extending along the major axis of the arm to accommodate the drive shaft, the inner faces of the crank arm and locking disc being juxtaposed; means to restrict the movement of the crank arm relatively to the locking disc, when the crank arm is in contact with the locking disc, to a predetermined straight line movement radially of the shaft, to enable the crank pin to be accurately located in fixed relation with respect to the edges of the clearance recess in the locking disc; and means to secure the crank arm and locking disc together to maintain such adjustment.

6. In an intermittent movement for motion picture projecting machines, the combination with a star wheel; of an assembled drive unit therefor, including a drive shaft; a crank arm formed separately therefrom, and being slotted along its major axis to accommodate the drive shaft, and to enable adjustment of the crank arm radially of the shaft; a wrist pin projecting laterally from a point in the major axis of the arm near its outer end to impart a step by step movement to the star wheel; means fast with the shaft and to which means the crank arm is secured, to maintain the crank arm where adjusted; and a pin and slot connection between the last-named means and the crank shaft, said connection also located in the major axis of the crank arm, to restrict the radial adjustment of the crank arm to a predetermined straight line.

7. In an intermittent movement for motion picture projecting machines, the combination with a star wheel; of an assembled drive unit therefor, including a drive shaft; a crank arm formed separately therefrom, and being slotted along its major axis centrally of the hub of the crank arm to accommodate the drive shaft, and enable adjustment of the crank arm radially of the shaft; a wrist pin projecting from a point in the major axis of the crank arm near its outer end; a star wheel locking member having a peripheral recess to afford a clearance for the teeth of the star wheel during its step by step actuation by the wrist pin; mutually co-acting guide and locating means on the crank arm and locking member, said means on the locking member lying in a line with, and diametrically opposite the deepest point of the clearance recess, said coacting guide and locating means on the crank arm lying in the major axis of the arm, and means to hold the arm in its adjusted position with its wrist pin in proper relation to the opposite edges of the clearance recess.

8. In an intermittent movement for motion picture projecting machines, the combination with a star wheel; of an assembled drive unit therefor, including a drive shaft; a crank arm formed separately from the shaft and being slotted along its major axis and centrally of its hub to accommodate the drive shaft, and to afford an adjustment of the crank arm radially of the shaft; a wrist pin projecting from a point in the major axis of the crank arm near the outer end thereof to impart a step by step movement to the star wheel; means fast with the shaft, and to which means the crank arm is secured when in adjusted position to lock the star wheel against movement during its dwell periods; and interengaging ways on the adjacent faces of the crank arm and of said means, respectively, said ways effective when interengaged, to restrict the radial movement of the crank arm to a single predetermined path.

9. In a motion picture projection machine, the combination of a star wheel; means to impart an intermittent movement to the star wheel alternating with dwell periods, including a drive shaft; a locking member secured to the shaft to co-act with the star wheel to lock the star wheel against rotation during the dwell periods, the periphery of the locking member having a clearance recess; a crank arm formed separately from the locking member; a crank pin projecting laterally from a point near the free end of the crank and in the longitudinal axis of the crank arm, to impart intermittent movement to the star wheel, the crank arm having an elongated aperture extending along the longitudinal axis of the crank arm, to accommodate the drive shaft; said crank arm having a locating means positioned in the longitudinal axis of the crank arm; a second locating means on the locking member interengaged with the first-named locating means to facilitate the accurate assembly of the crank arm relatively to the recess in the locking member, and to restrict the movement of the crank arm to a predetermined straight line radially of the shaft, to enable the crank pin to be accurately positioned with respect to the edges of the clearance recess in the locking member; and means to releasably secure the crank arm and locking member together to maintain such adjustment.

10. In an intermittent movement for moving picture projecting machines, the combination with a star wheel; of a driver unit therefor, including a drive shaft, a slotted crank arm element adjustable radially of the shaft; a wrist pin carried by the crank arm element to cooperate with the star wheel; a recessed locking element fast on the drive shaft to lock the star wheel at the conclusion of each increment of movement thereof; and means to adjustably secure the crank arm directly to said locking element, including threaded fastenings mounted loosely in one of said elements and snugly in threaded openings in the other of said elements to adjustably and frictionally secure said elements together against movement after adjustment, when the threaded fastenings are screwed tight.

11. In an intermittent movement for motion picture projecting machines, the combination with a star wheel; of a drive unit therefor, including a drive shaft; a slotted crank arm element adjustable radially of the shaft; a wrist pin carried by the crank arm element to co-operate with the star wheel; a recessed locking element fast on the drive shaft to lock the star wheel after each step of rotation; one of said elements having threaded holes, the other of said elements having slightly larger unthreaded holes to register with the threaded holes in any relative adjustment of the elements to the extent permitted by the excess size of the unthreaded larger holes; threaded fastening means passing loosely through the unthreaded larger holes of one element, and threading into the threaded holes of the other of said elements to secure the crank arm element to the locking element against relative movement after adjustment; and interengaging means on the crank arm element and the star-wheel locking element, respectively, to insure the proper assembly of the two elements and to locate and retain the crank arm element in accurate relation with the recess in the locking element.

12. In an intermittent movement for motion picture projecting machines, the combination with a star wheel; of a drive unit therefor, including a drive shaft; a crank arm centrally slotted along its major axis to accommodate the drive shaft, for radial adjustment relatively to the shaft; a wrist pin mounted on the crank arm to engage and impart intermittent movement to the star wheel; a peripherally recessed locking disc mounted on the drive shaft to lock the star wheel against accidental rotation when the unrecessed peripheral portion of the locking disc is presented to the star wheel; mutually co-acting and inter-engaging means on the contacting inner faces of the locking disc and crank arm, respectively, to insure the correct positioning of the crank arm relatively to the recess in the locking disc, and to restrict the radial adjustment of the crank arm to a predetermined radius; and means to seure the crank arm directly to the locking disc against relative movement to the disc and shaft in any of the adjusted positions of the crank arm.

13. In an intermittent movement, the combination with a Geneva star wheel; of a drive unit to impart a step-by-step rotation thereto, interspersed with the dwell periods during which the star wheel is stationary, said drive unit including a shaft; a recessed locking member fast with the shaft, the unrecessed periphery of which member engages the star wheel during its dwell periods to lock the wheel against rotation, and the recess affording a clearance for the teeth of the star wheel during its intermittent periods of rotation; a crank arm formed separately from the locking member and adjustably attachable thereto; locating and guiding means to insure the accurate positioning of the crank arm on the locking member and in diametric alinement with the deepest point of the recess in the locking member; and means to releasably secure the crank arm to the locking member against relative movement when in adjusted position.

14. As an article of manufacture; a drive unit for the star wheel of an intermittent movement, said drive unit including a drive shaft; a crank arm centrally slotted along its major axis to accommodate the shaft, and for radial adjustment relating to the shaft; a wrist pin mounted on the crank arm to impart intermittent movement to the star wheel, a peripherally recessed locking disc mounted on the drive shaft to lock the star wheel against accidental rotation when the unrecessed peripheral portion of the locking disc is presented to the star wheel; mutually interengaging means on the locking disc and crank arm, respectively, to insure the correct positioning of the crank arm relatively to the recess in the locking disc; and threaded fastening means to connect the crank arm directly to the locking disc against relative movement in any of the adjusted positions of the crank arm.

HENRY F. HEIDEGGER.

REFERENCES CITED

The following references are of record in the file of this patent:

UNITED STATES PATENTS

| Number | Name | Date |
| --- | --- | --- |
| 934,164 | Gotti | Sept. 14, 1909 |
| 1,221,097 | Schweitzer | Apr. 3, 1917 |
| 1,442,021 | Workman | Jan. 9, 1923 |
| 1,503,793 | Kershaw | Aug. 5, 1924 |
| 1,563,669 | Snyder | Dec. 1, 1925 |
| 1,825,442 | Chambon | Sept. 29, 1931 |
| 2,369,043 | Halford et al. | Feb. 6, 1945 |